Jan. 3, 1933.  A. J. WEHR ET AL  1,892,860
VEHICLE TRAFFIC INDICATOR
Filed July 1, 1929  2 Sheets-Sheet 1
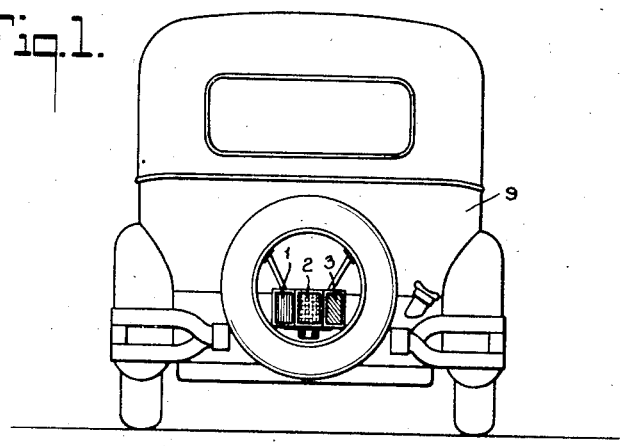
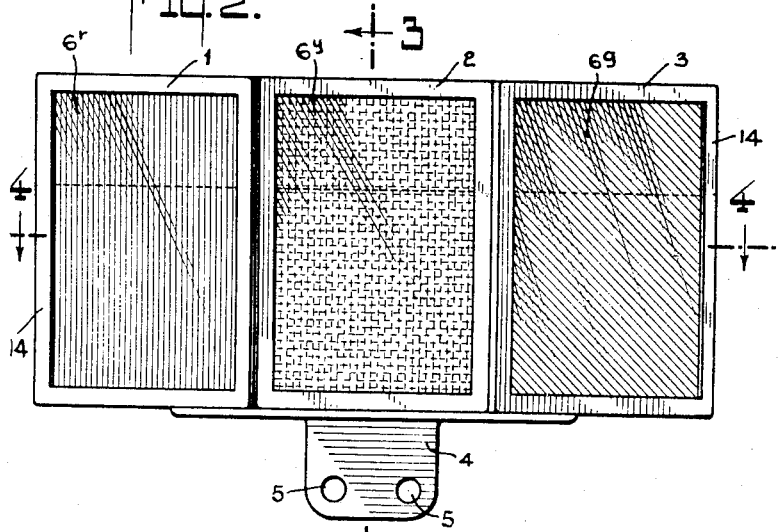
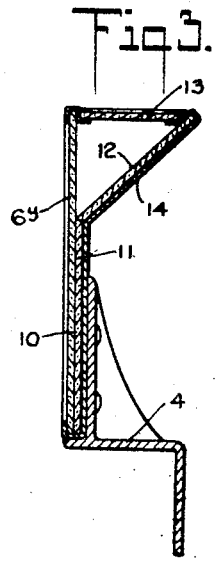
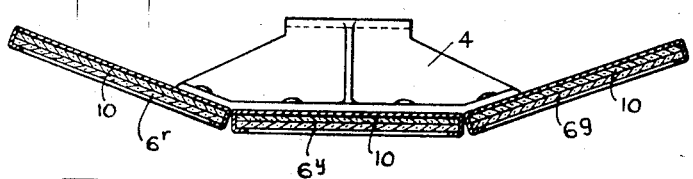
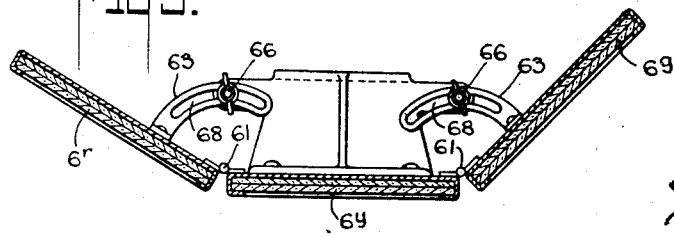
INVENTORS
ARTHUR J. WEHR
AMORY V. ELIOT
JOHN W. SHEERES
BY
THEIR ATTORNEY.

Jan. 3, 1933. A. J. WEHR ET AL 1,892,860
VEHICLE TRAFFIC INDICATOR
Filed July 1, 1929 2 Sheets-Sheet 2
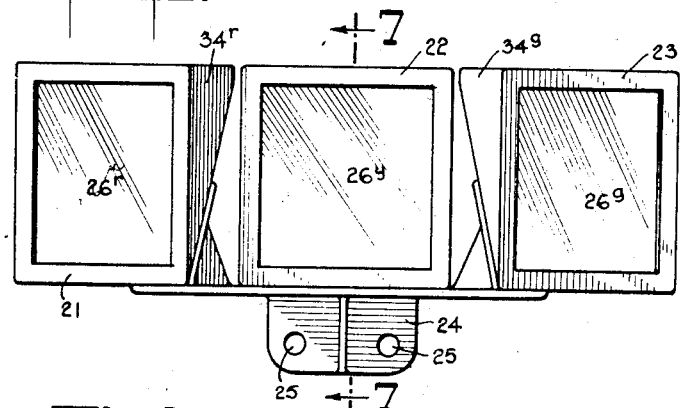
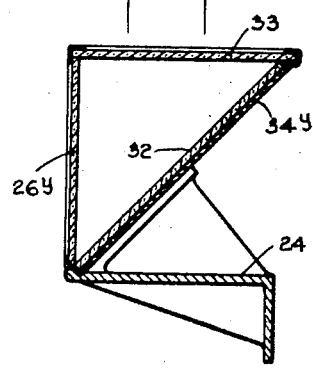
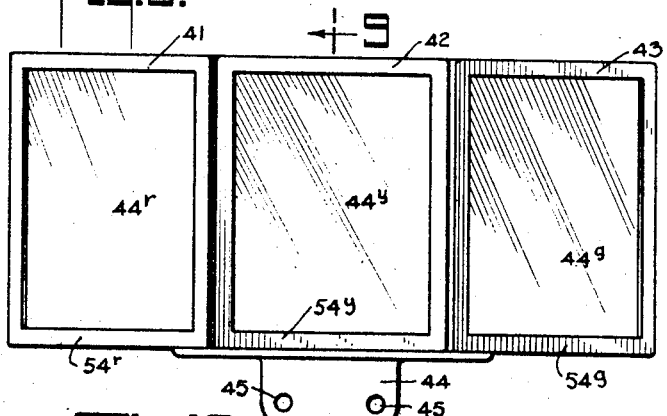
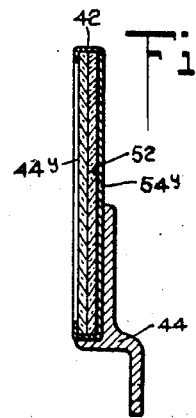
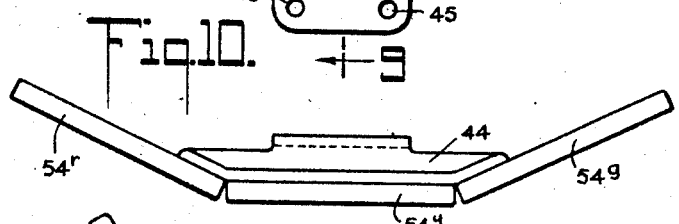
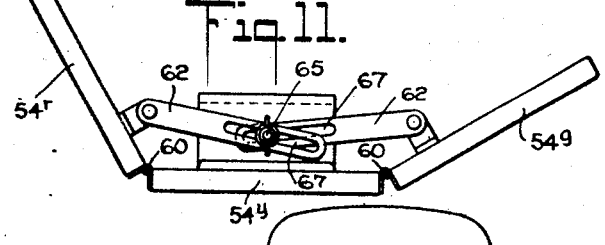
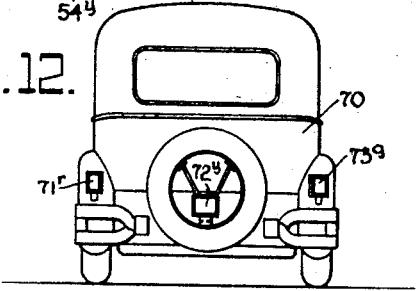
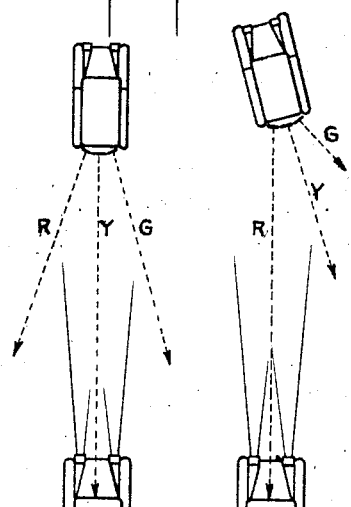
INVENTORS
ARTHUR J. WEHR
AMORY V. ELIOT
JOHN W. SHEERES
BY
THEIR ATTORNEY.

Patented Jan. 3, 1933

1,892,860

UNITED STATES PATENT OFFICE

ARTHUR J. WEHR, OF SAN FRANCISCO, CALIFORNIA; JOHN W. SHEERES, OF JACKSON HEIGHTS, NEW YORK; AND AMORY V. ELIOT, OF FORT SAM HOUSTON, TEXAS

VEHICLE TRAFFIC INDICATOR

Application filed July 1, 1929. Serial No. 375,256.

This invention relates to traffic signals applicable for attachment to all vehicles, boat, airplane or airship.

More particularly, each traffic signal comprises a plurality of faces bearing wholly or partially reflecting portions and different colors, whereby upon installing the same upon a vehicle, the direction of travel of the so equipped vehicle is ascertainable from the rear as by the driver or other occupant of the succeeding vehicle, and thereby promoting safety in traffic.

Our invention is similarly advantageous in informing pedestrians, drivers or other occupants of succeeding cars of changes of direction of travel of a preceding vehicle.

Our invention is adaptable to various forms of embodiment. One form of embodiment comprises three indicating faces arranged in desired angular relation to one another. In manufacture, the three indicating faces may be mounted on a suitable bracket and set at stationary angles to one another.

In general, the extent of angular relation of the two lateral indicating faces respectively relative to the central face is determined by the length of the wheel base of the vehicle or otherwise controlling the movement of the rear of the vehicle relative to the front.

Another form of embodiment of our invention comprises three indicating faces which may be adjustably set relative to one another.

The further embodiment of our invention comprises three indicating faces which are mechanically separately mounted at the rear of the vehicle in the desired angular relation to one another.

The above stated various types of our invention are particularly applicable at night time, the lighting of the respective indicating faces being furnished by the light rays of the headlights of the succeeding car.

A further general embodiment of our invention comprises the employment of each indicating face, in whole or in part, having means for using sunlight, for effecting the lighting of the respective indicating faces in the line of sight to a driver or other occupant of a succeeding car.

Further features and objects of our invention will be more fully understood from the following detail description and the accompanying drawings, in which Fig. 1 is a rear elevation of an automobile equipped with our signalling device;

Fig. 2 is a front elevation of that embodiment of our signalling device which is adapted for use during the day and during the night;

Fig. 3 is a right section taken through 3—3 of Fig. 2.

Fig. 4 is a right section taken through 4—4 of Fig. 2.

Fig. 5 is a plan view of a right section of a signalling device wherein the angularity of the reflecting surfaces relative to each other is adjustable.

Fig. 6 is a front elevation of a signalling device embodying a modification of the above stated forms;

Fig. 7 is a right section taken through 7—7 of Fig. 6;

Fig. 8 is a front elevation of a signalling device adapted for use only at night;

Fig. 9 is a right section through 9—9 of Fig. 8;

Fig. 10 is a plan view of the device illustrated in Figs. 8 and 9.

Fig. 11 is a plan view of a device similar to that shown in Figs. 8, 9 and 10 equipped with means for adjusting the angularity of the reflecting surfaces relative to each other.

Fig. 12 is a rear elevation of an automobile equipped with a signalling device comprising separate reflecting surfaces spaced from each other.

Fig. 13 is a diagrammatic illustration of the operation of a signalling device wherever the path of the light rays is indicated by dashed lines.

In Figs. 1, 2, 3 and 4 we have illustrated a signalling device adapted to function effectively during the hours of daylight, when sunlight is used to operate the device and also during the hours of darkness when the light from the lamps of succeeding cars is utilized to operate it. In Fig. 1 we have shown it attached to the spare tire carrier of an automobile 9 in a position where no part of the car or no accessories carried by the car will obstruct light rays passing to or from the device. The particular embodiment of our invention we have seen fit to illustrate and describe comprises three separate reflecting units 1, 2 and 3, angularly disposed to each other as shown clearly in Fig. 4 and mounted upon a suitable supporting bracket 4 constructed so that it may be conveniently attached to the vehicle by bolts or rivets which may be inserted in holes 5—5. Each unit comprises means for reflecting a differently colored light which is shown in this embodiment as consisting of a colored transparent member $6r$, $6y$ and $6g$. For reasons to be explained hereafter, we have illustrated unit 1 as equipped with a transparent member $6r$ which will transmit red light, unit 2 with member $6y$ which will transmit yellow light and unit 3 with $6g$ which will transmit green light. Each unit also comprises a reflecting surface which is here illustrated as a separate member from the transparent members $6r$, $6y$ and $6g$, and is illustrated at 10 as comprising a substantially vertical lower section 11 and an upper section disposed at an angle of approximately 45° with the vertical. Above the angularly disposed reflecting section 12 in a substantially horizontal plane is a transparent colorless top member 13. The colored transparent members, the reflecting member and the top transparent colorless members are all mounted in a suitable frame 14 adapted to securely and immovably hold each in proper relation to the others and preferably so constructed as to form a dirt-proof and moisture-proof unitary structure so that the highly polished reflecting surface is protected from the deleterious effects of exposure to the elements. We have seen fit to show frame 14 and supporting bracket 4 riveted together, but it is obvious that they may be made in one piece if so desired. The transparent members $6r$, $6y$ and $6g$, also 13, may be made of glass, mica, celluloid, bakelite, or other suitable material and the reflecting surface may be of polished metal or a "silvered" glass such as the ordinary mirror.

In Figs. 6 and 7 we have shown a signalling device constructed for use during the daylight hours and adapted to utilize the rays of the sun to operate it. In operation and construction it is very similar to the upper part of the combination device illustrated in Figs. 2, 3 and 4. It is shown as comprising three units 21, 22 and 23, mounted upon a supporting bracket adapted to attach the device to a vehicle by means of bolts or rivets through holes 25—25. Each unit is made up of a substantially vertical colored transparent member shown at $26r$, $26y$ and $26g$ and may be colored red, yellow and green respectively, a reflecting member 32 preferably set at an angle of about 45° to the vertical, and a transparent colorless horizontal member 33 superimposed above the reflecting member and the vertical colored transparent member, as is clearly shown in Fig. 7. These three elements of each unit are joined into a single structure which is weather-proof by frames $34r$, $34y$ and $34g$. In this we have found it convenient to show a separate frame member for each unit, each adapted to be secured to and supported by bracket 24.

In Figs. 8, 9 and 10 we have illustrated a signalling device adapted for night driving wherein the reflected rays of the headlights of a succeeding car are utilized for operation. In this embodiment we have also chosen to show three units 41, 42 and 43, each mounted in a substantially vertical plane and angularly disposed relative to each other upon a supporting bracket 44 supplied with holes 45—45 to assist in attaching the device to the vehicle by bolts or rivets for instance. As in the two previous embodiments described, one unit (shown as the left hand unit in Fig. 8) may be equipped with a transparent colored member $44r$ which may be red, another (such as the middle unit) with a transparent colored member $44y$ which may be yellow, and the third with a transparent colored member $44g$ which may be green. As is clearly shown in Fig. 10 the red and green units are angularly disposed to the yellow unit for reasons to be explained hereafter. Each unit comprises a reflecting element 52 mounted behind the transparent colored member and which may comprise a separate piece of polished metal or be merely a "silvered" coating on the back of the transparent colored member such as that on the back of a mirror. Both members are mounted in frames $54r$, $54y$ and $54g$, to form a strong weather-proof unitary structure which may be attached to supporting bracket 44 in any convenient manner.

Figs. 5 and 11 illustrate embodiments of our invention wherein the two outer units, in the former figure, $6r$ and $6g$, and in the latter figure $54r$ and $54g$, are hinged to the center units $6y$ and $54y$, as shown at 60—60 and 61—61, and are adapted to be secured in any desired angular position by means of arms 62—62 (Fig. 11) and 63—63 (Fig. 5) and suitable thumb screws and bolts 65 and 66—66 adapted to operate in slots 67—67 (Fig. 11) and 68—68 (Fig. 5) in an obvious manner.

Fig. 12 illustrates a form of our invention wherein the units are spaced from each other and are shown mounted on the rear mudguards and the spare tire bracket of an automobile or other vehicle 70, or similarly mounted on other parts thereof. The yellow signal unit $72y$ may be mounted in the center of the car with its plane at right angles to the longitudinal axis of the car and the red and green units 71r and 73g mounted on each mudguard, the red on the left rear mudguard and the green on the right rear mudguard and each angularly disposed to the longitudinal axis of the car.

In operation the signalling device is mounted on the rear of an automobile or other vehicle in a position so that the incident rays, from the sun or the headlights of the succeeding car, and the reflected rays therefrom are not intercepted by any portion of the vehicle or anything mounted thereon. The center unit which we have chosen to color yellow, is mounted with its plane at right angles to the longitudinal axis of the vehicle so that when said vehicle is traveling in a straight line, light rays reflected therefrom will be reflected straight backward to a motorist or other person immediately following the vehicle carrying the signalling device. The red and green reflectors may be placed on the left and right of the yellow reflector respectively and angularly disposed thereto, the former pointing rearwardly to the left and the latter rearwardly to the right as viewed in a plan view such as Fig. 10 for instance, so that light rays reflected therefrom will diverge away from each other to such an extent that they will not be visible to a following motorist when both automobiles are travelling in a straight line. This is illustrated in Fig. 13 wherein the red and green reflected rays are indicated by the dashed lines marked R and G respectively, and are shown diverging so as not to be visible to a person sitting in a following vehicle, whereas the path of the yellow ray which is indicated at Y is straight back and is visible to the occupants of the following car. The right hand diagram of Fig. 13 indicates the course of the rays when the car in front turns to the left and shows that the reflected rays from the yellow reflector swing out of view of the occupants of the following car and the reflected rays from the red reflector become visible. The result is a red signal which acts as a warning of a left turn. Similarly, if the car ahead turns to the right, the rays reflected from the green reflector are brought into the line of vision of the driver of the succeeding vehicle and the red and yellow rays become no longer visible with the result that a green signal is given as the foremost car turns right. Because of the angularity of the units only one signal at a turn is visible to the following motorist and, of course, these signals may be of other colors than red, yellow and green, and also if desired the yellow signal may be omitted entirely so that the occupant of the succeeding car received a signal only when the preceding car turns from a straight course.

At night the rays from the headlights of a following car act to operate the signal devices shown in Figs. 2 and 8 by reflection from the substantially vertical reflecting members thereof. In the daytime the rays of the sun serve to operate the device shown in Figs. 2 and 6, because when the sun rays enter the top horizontal transparent member they are reflected from the inclined reflecting member and projected in a substantially horizontal plane through the colored transparent member. In this type of signal device we have described the vertical transparent member as being colored and the horizontal transparent member as being colorless. Of course, it is obvious that the horizontal member may be colored and the vertical member colorless with the same result.

We have shown adjustable units because the desirable angularity between the units may vary to a small extent with vehicles of various wheelbases or perhaps with different kinds of vehicles, but this variation is small in any case.

Whereas, we have referred to specific colors in relation to part of our invention, the colors may be selected as desired, and whereas we have referred to specific forms thereof, it will be understood that many changes and modifications may be made without departing from the spirit of the invention.

We claim:—

1. A vehicle signal adapted for attachment to a vehicle and serving to give direction indication by light reflection and comprising a plurality of reflecting devices angularly disposed to each other, each of said devices including a reflector in a plane angularly disposed to the vertical, and a colorless transparent member and a colored transparent member disposed substantially at right angles to each other and positioned to transmit incident and reflected rays of light to and from said reflector, the colored members of the different devices being of different colors.

2. A vehicle signal adapted for attachment to a vehicle and serving to give direction indication by light reflection and comprising a plurality of reflecting devices angularly disposed to each other, each of said devices including a vertical reflecting portion, a reflecting portion inclined to the vertical, a colorless transparent member and a colored transparent member disposed substantially at right angles to each other and positioned to transmit incident and reflected rays of light to and from said inclined reflector portion, the colored members of the different devices being of different colors.

3. In a signal adapted for mounting on a vehicle, the combination of a base having a bracket portion adapted for connection to the vehicle, a reflecting device fixedly mounted on the base, other reflecting devices at opposite ends of the first one, mounted for angular adjustment in vertical planes in relation to the first device and the base, slotted members connected to the adjustable devices and quickly manipulable means cooperating with the slotted members and base for securing the adjustable devices in adjusted positions, each of the reflecting devices including a vertical reflector, an angular reflector, a horizontal uncolored glass above the angled reflector, and a vertical colored glass extending from the rearward edge of the uncolored glass to the bottom of the vertical reflector whereby vertical sunlight or horizontal light from a projector will be reflected rearward, said colored glasses of the different devices being of different colors.

In testimony whereof we have signed this specification this first day of March 1929.

ARTHUR J. WEHR.
AMORY V. ELIOT.
JOHN W. SHEERES.